(12) United States Patent
Suetsuna et al.

(10) Patent No.: US 7,763,094 B2
(45) Date of Patent: Jul. 27, 2010

(54) METHOD OF MANUFACTURING HIGH FREQUENCY MAGNETIC MATERIAL

(75) Inventors: Tomohiro Suetsuna, Kawasaki (JP);
Seiichi Suenaga, Yokohama (JP);
Kouichi Harada, Tokyo (JP); Maki Yonetsu, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 557 days.

(21) Appl. No.: 11/880,518

(22) Filed: Jul. 23, 2007

(65) Prior Publication Data

US 2008/0267806 A1    Oct. 30, 2008

(30) Foreign Application Priority Data

Aug. 2, 2006    (JP) .............................. 2006-211196

(51) Int. Cl.
*B22F 3/00*    (2006.01)
*B22F 9/20*    (2006.01)
*H01F 1/26*    (2006.01)

(52) U.S. Cl. ........................ 75/348; 148/104; 148/108; 252/62.55

(58) Field of Classification Search .................. 75/348; 148/104, 105, 108, 306, 313; 252/62.55; 428/403, 570

See application file for complete search history.

(56) References Cited

U.S. PATENT DOCUMENTS 1,651,958 A * 12/1927 Lowry ........................ 148/104

4,543,208 A * 9/1985 Horie et al. ............... 252/62.54
4,919,734 A * 4/1990 Ochiai et al. ................ 148/306
2005/0133116 A1    6/2005 Nishijima et al. ........... 148/105
2006/0008645 A1 * 1/2006 Kishimoto et al. .......... 428/403

FOREIGN PATENT DOCUMENTS

| JP | 90-48618 | 2/1997 |
| JP | 2000-313902 | 11/2000 |
| JP | 2001-2710756 | 8/2001 |
| JP | 2004-281846 | 10/2004 |
| JP | 2005-171275 | 6/2005 |
| JP | 2006-128278 | 5/2006 |

OTHER PUBLICATIONS

U.S. Appl. No. 11/378,339, filed Mar. 20, 2006, Harada.

* cited by examiner

*Primary Examiner*—Roy King
*Assistant Examiner*—Ngoclan T Mai
(74) *Attorney, Agent, or Firm*—Ohlandt, Greeley, Ruggiero & Perle, L.L.P.

(57) ABSTRACT

A precursor particle having a particle size of 10 nm or more and 1 μm or less, and comprising a first compound selected from an alkoxide, a hydroxide, a sulfate, a nitrate, a carbonate, or a carboxylate of magnetic metal containing at least one metal of Fe and Co, and a second compound selected from an alkoxide or a hydroxide, a sulfate, a nitrate, a carbonate, or a carboxylate of a metal element for forming an oxide, is prepared. Then the precursor particle is heated in a reducing atmosphere to form an insulating particle made of an oxide of the metal element by decomposing the second compound, and to precipitate a particle of the magnetic metal in the insulating particle at a particle size of 1 nm or more and 100 nm or less, thereby manufacturing a high frequency magnetic material.

13 Claims, No Drawings in # METHOD OF MANUFACTURING HIGH FREQUENCY MAGNETIC MATERIAL

CROSS-REFERENCE TO RELATED APPLICATIONS

This application is based upon and claims the benefit of priority from prior Japanese Patent Application No. 2006-211196, filed Aug. 2, 2006, the entire contents of which are incorporated herein by reference.

BACKGROUND OF THE INVENTION

1. Field of the Invention

The invention relates to a method of manufacturing a high frequency magnetic material, and more particularly, to a method of manufacturing a high frequency magnetic material useful for magnetic components to be used in a high frequency region of 10 MHz or more, especially in a range of 100 MHz to several GHz.

2. Description of the Related Art

Magnetic materials are applied in electromagnetic wave absorbers, magnetic ink, inductor and the like, and their importance is increasing year after year. In these magnetic components, permeability real part ($\mu'$) or permeability imaginary part ($\mu''$) are used. For example, both a high $\mu'$ and a low $\mu''$ are used for inductor. A high $\mu''$ is used for electromagnetic wave absorber. Accordingly, when used actually as components, $\mu'$ and $\mu''$ must be controlled according to an operating frequency band of an electronic device. Recently, the operating frequency band of the electronic device is becoming higher, and therefore, the technology for manufacturing materials capable of controlling $\mu'$ and $\mu''$ at high frequency is being demanded.

Magnetic materials for inductor to be used in a high frequency region of 1 MHz include ferrite and amorphous alloy. These magnetic materials show excellent magnetic characteristics, without magnetic loss in a region of 1 MHz to 10 MHz (low $\mu''$), and having a high $\mu'$. In these magnetic materials, however, the permeability real part $\mu'$ is lowered in a higher frequency region of 10 MHz or more, and satisfactory characteristics are not always obtained.

Accordingly, various efforts have been attempted to develop inductance elements by thin film technologies, such as a sputtering method and a plating method, and excellent characteristics in a high frequency region have been confirmed. However, a large apparatus is needed for the thin film technologies such as the sputtering method, and precise control of film thickness and the like is needed. For this reason, the performance is not sufficiently satisfactory in the aspects of cost or yield. Further, the inductor produced by the thin film technology is insufficient in long-term thermal stability of magnetic characteristics in the conditions of high temperature and high humidity.

On the other hand, in the electromagnetic wave absorber, a high $\mu''$ is used to absorb noise generated along with high frequency of an electronic appliance to thereby reduce malfunctions and other problems of electronic devices. Examples of an electronic device include a semiconductor device such as an IC chip, and various communication devices. Such electronic devices are used in a high frequency region from 1 MHz to several GHz, or tens of GHZ or more. Recently, in particular, electronic devices to be used in a high frequency region of 1 GHz or more are increasing in number. Electromagnetic wave absorbers of electronic devices to be used in a high frequency region have been conventionally manufactured by a binder forming method of mixing ferrite particles, carbonyl iron particles, FeAlSi flakes, FeCrAl flakes etc. with resins. In these materials, however, both $\mu'$ and $\mu''$ are extremely low in a high frequency region of 1 GHz or more, and satisfactory characteristics are not always obtained.

Additionally, in materials synthesized by a mechanical alloying method or the like, long-term thermal stability is insufficient, and the yield is low.

Thus, the high frequency magnetic materials manufactured by the conventional methods are insufficient in long-term thermal stability of magnetic characteristics, low in manufacturing yield, and hence high in manufacturing cost.

BRIEF SUMMARY OF THE INVENTION

According to an aspect of the present invention, there is provided a method of manufacturing a high frequency magnetic material, comprising:

preparing a precursor particle having a particle size of 10 nm or more and 1 µm or less, and comprising a first compound selected from an alkoxide, a hydroxide, a sulfate, a nitrate, a carbonate, or a carboxylate of a magnetic metal containing at least one metal of Fe and Co, and a second compound selected from an alkoxide, a hydroxide, a sulfate, a nitrate, a carbonate, or a carboxylate of a metal element for forming an oxide; and heating the precursor particle in a reducing atmosphere to form an insulating particle made of an oxide of the metal element by decomposing the second compound, and to precipitate a particle of the magnetic metal in the insulating particle at a particle size of 1 nm or more and 100 nm or less.

DETAILED DESCRIPTION OF THE INVENTION

Methods of manufacturing a high frequency magnetic material according to embodiments of the invention will be specifically described below.

First Embodiment

First, precursor particle having a particle size of 10 nm to 1 µm, and including a first compound and a second compound is prepared. The first compound is selected from an alkoxide, a hydroxide, a sulfate, a nitrate, carbonate, or a carboxylate of a magnetic metal containing at least one metal of Fe and Co. The second compound is selected from an alkoxide, a hydroxide, a sulfate, a nitrate, a carbonate, or a carboxylate of a metal element for forming an oxide.

Subsequently, the precursor particle is heated in a reducing atmosphere. At this time, second compound is decomposed to form insulating particle made of oxide of the metal element, and particle of the magnetic metal in the first compound is precipitated in the insulating particle at a particle size of 1 to 100 nm, thereby manufacturing a granular high frequency magnetic material.

That is, by heating the precursor particle in the reducing atmosphere, the first compound such as a salt of a magnetic metal element composed of at least one of Fe and Co or an alloy based thereon in the precursor particle is reduced to precipitate magnetic metal particle. At the same time, the second compound, such as a salt composed of the metal element for forming an oxide in the precursor particles, is decomposed in the oxide of the metal element, and the oxide is induced so as to surround the magnetic metal particle at the decomposition. As the result, the texture composed of an insulating particle made of the oxide and the magnetic metal particle precipitated in the insulating particle becomes denser. That is, adhesion between the insulating particle and the precipitated magnetic metal particle is enhanced. This enables to obtain a granular high frequency magnetic material excellent in thermal magnetic characteristic for a long time, and the volume of unnecessary space such as pores can be decreased by a dense texture to obtain a high frequency magnetic material of a small size. The magnetic characteristic can be enhanced by decreasing the air gaps, such as unnecessary pores having effects on loss of magnetic characteristics. Further, in the case of the precursor particle, the reactivity is very high and the reaction time can be shortened. This makes it possible to suppress aggregation or sintering of the precipitated magnetic metal particle, and to obtain an excellent granular high frequency magnetic material in which fine magnetic metal particle is dispersed uniformly.

Examples of the magnetic metal containing at least one metal of Fe and Co include Fe, Co, FeCo alloy, FeCoNi alloy, Fe base alloy, and Co base alloy. In the case of an alloy, the total amount of Fe and Co is preferred to be 50% by atomic or more in the alloy. In particular, an Fe base alloy partly containing Co or Ni is preferred from the viewpoint of the excellent oxidation resistance, and an FeCo base alloy is particularly preferred from the viewpoint of the high saturation magnetization.

Examples of the Fe base alloy or Co base alloy include FeNi alloy, FeMn alloy, FeCu alloy, CoNi alloy, CoMn alloy, CoCu alloy, and FeCo alloy which contain Ni, Mn, Cu or the like as a second component. These magnetic metals can enhance the high frequency characteristic. Among the Fe base alloys, in particular, FeCo, FeCoNi, and FeNi are preferred because the oxidation resistance is enhanced, and part of such alloys is permitted to be substituted with a third element.

Note that alloying of a nonmagnetic metal element is permitted in Fe, Co, FeCo alloy, FeCoNi alloy, Fe base alloy, and Co base alloy. If the amount of the nonmetallic metal element is too much, the saturation magnetization of the obtained magnetic material is lowered too much. For this reason, the amount of the nonmagnetic metal alloy is preferred to be 10% by atomic or less. Although the nonmagnetic metal is permitted to be dispersed alone in the mixture, the amount of the nonmagnetic metal is preferred to be 20% by volume or less in the magnetic metal particles.

Examples of an alkoxide as the first compound of the magnetic material include methoxide, ethoxide, butoxide, and propoxide.

Examples of the metal element include at least one metal selected from the group consisting of Mg, Mn, Al, Si, Ca, Zr, Ti, Hf, Zn and rare earth elements, Ba and Sr. Among these metal elements, Mg and Mn are particularly preferred.

In combination of the first compound, such as a hydroxide of a magnetic metal, and the second compound, such as a hydroxide of an a metal element for forming an oxide, it is preferred to select a combination so that the difference between the standard formation Gibbs energy of the magnetic metal particle and standard formation energy of the oxide of the metal element is 100 kJ/mol or less at a temperature of 100 to 800° C., or more preferably 50 kJ/mol or less. Examples of such a combination of the first compound and second compound include $Fe(OH)_2/Mg(OH)_2$, $Co(OH)_2/Mg(OH)_2$, $Fe(OH)_2/Si(OH)_4$, $Co(OH)_2/Si(OH)_4$, $Fe(OH)_2/MgCO_3$, and $Fe(OH)_2/MgSO_4$. Thus selecting the first and second compounds provides the following advantage. That is, in the heating process in the reducing atmosphere, a reaction in which the first compound, such as a salt composed of the magnetic metal element, precipitates magnetic metal particle, and a reaction in which the second compound such as a salt composed of the metal element for forming an oxide produces an oxide of the metal element are substantially the same in energy values. Consequently, the reactions take place substantially simultaneously. As a result, while precipitating the magnetic metal particles, the precipitated magnetic metal particles are incorporated by the insulating oxide, and the reactions proceed. It is hence possible to manufacture a dense high frequency magnetic material having the magnetic metal particle dispersed and embedded in the insulating particle.

A molar ratio of the first compound and the second compound in the precursor particle is preferred to determine so that a volume fraction of the magnetic metal particle to a total volume of the magnetic metal particle and the insulating particle is 50% or more. For example, when the first compound is an Fe salt and the second compound is a Mg salt, a molar ratio of the first compound and the second compound is preferred to be 1.5:1 to 5:1. In the range of such mole ratio, it enables to produce a magnetic material having a high insulating property and a high volume fraction of the magnetic metal particle, therefore to able to realize an excellent of a high frequency characteristic.

Precursor particle is prepared, for example, by mixing powders of the first and second compounds, and drying the mixture at 100 to 200° C. (to evaporate the moisture in the hydrate). Precursor particle is also prepared by dissolving a mixed powder of the magnetic metal powder and powder of a metal element for forming an oxide in a desired solution to crystallize it, and drying the obtained crystal at 100 to 200° C. Herein, as the desired solution, used is an aqueous sulfuric acid solution when preparing a sulfate of magnetic metal and metal element, and also used is an aqueous nitric acid solution when preparing a nitrate of a magnetic metal and a metal element. When preparing a hydroxide of a magnetic metal and a metal element, it is synthesized by a coprecipitation method or a reverse coprecipitation method (precipitation method by dropping nitrate or the like in an aqueous alkaline solution such as ammonia) or sol-gel method. By thus crystallizing and drying, uniform precursor particle can be obtained.

Precursor particle of 10 nm to 1 μm in particle size is then sent to a heat treatment process (a process of sintering while decomposing and reducing), and components of a precursor are diffused smoothly to enable a dense high frequency magnetic material to be manufactured.

The reducing atmosphere includes nitrogen or argon atmosphere containing a reducing gas such as hydrogen or carbon monoxide, or nitrogen or argon atmosphere having the surrounding of an object of heating with a carbon material. The nitrogen or argon atmosphere containing the reducing gas is preferably formed by a stream, and the flow velocity of the stream is preferred to be 10 mL/min or more.

The heating temperature in the reducing atmosphere is preferably 100 to 800° C. If the heating temperature is lower than 100° C., the progress of the reducing reaction may be too slow. If it exceeds 800° C., on the other hand, aggregation and particle growth of precipitated metal fine particles may be promoted in a very short time.

The reducing temperature and time are not particularly specified as far as at least the first compound, such as a nitrate of a magnetic material, is reduced. The reducing time is determined in relation to the reducing temperature, and is preferred to be, for example, in a range of 10 minutes or more and 10 hours or less.

Magnetic metal particle to be precipitated by heating in the reducing atmosphere is preferred to have a particle size of 1 to 100 nm. Most preferably, the magnetic metal particle has a particle size of 10 to 50 nm. If the particle size of magnetic metal particle is less than 10 nm, superparamgnetism may occur or the magnetic flux quantity may be insufficient. If the particle size of magnetic metal particle exceeds 50 nm, on the other hand, eddy current loss increases in a high frequency band, and the magnetic characteristics may be lowered in the operating high frequency region. Moreover, a stable energy state may be formed more easily in a multiple magnetic domain structure than in a single magnetic domain structure. At this time, the high frequency characteristic of permeability in the multiple magnetic domain structure is lower than that in the single magnetic domain structure. Therefore, when applied in magnetic components for high frequency, it is preferred that the magnetic metal particle is present as single magnetic domain particle. The maximum particle size of the single magnetic domain structure is about 50 nm or less. Summing up, the particle size of magnetic metal particle is preferred to be 50 nm or less.

The magnetic metal particle is preferred to be aligned in at least in two axes in the crystal orientation of the insulating particle to contact with the magnetic metal particle. By such definition, lattice matching of the magnetic metal particle and insulating particle is greatly improved, and a very thermally-stable high frequency magnetic material is obtained. Examples of combinations of the magnetic metal particle aligned in the crystal orientation in two or more axes with the insulating particle are Co/MgO, Fe—Ni/MgO, Co—Fe/MgO, Co—Ni/MgO, Co/MnO, Fe—Ni/MnO, Co—Fe/MnO, and Co—Ni/MnO.

It is preferred to apply a magnetic field when heating the precursor particle in a reducing atmosphere. Such application of the magnetic field enables crystal axes of the precipitated magnetic metal particle to be aligned. By allowing crystal axes of magnetic metal particle to be oriented, the crystal magnetic anisotropy can be controlled to enhance the high frequency magnetic characteristic.

A volume fraction (Vf) of magnetic metal particle to a total volume of the magnetic particle and insulating particle is preferred to be 50% or more, excluding air gaps such as pores. The high frequency magnetic material having such a volume fraction of the magnetic metal particle has high saturation magnetization per unit volume or unit weight, resulting in improvement in permeability.

When the granular high frequency magnetic material obtained in the first embodiment is applied in a magnetic component such as an inductor or an electromagnetic wave absorber, the magnetic material is dispersed in synthetic resin such as epoxy resin to be formed in a sheet or bulk form.

As described herein, the first embodiment realizes manufacture of a high frequency magnetic material showing an excellent magnetic characteristic in a high frequency region, the material being excellent in long-term thermal stability of a magnetic characteristic, at low cost and at high yield.

The obtained high frequency magnetic material is almost free from loss except for ferromagnetic resonance loss, shows a high permeability even at a high frequency, and has a ferromagnetic resonance frequency of several GHz. Accordingly, the high frequency magnetic material has a high permeability real part ($\mu'$) and a low permeability imaginary part ($\mu''$) in a lower frequency region than the ferromagnetic resonance frequency, and therefore, is can be used as a high permeability component such as an inductor. Since the obtained high frequency magnetic material has a low $\mu'$ and a high $\mu''$ in the vicinity of the ferromagnetic resonance frequency, it can be used as an electromagnetic wave absorber.

The material has such a very wide versatility that even only one high frequency magnetic material can be applied both as a high permeability component such as an inductor, and as an electromagnetic wave absorber, by properly selecting the frequency band.

In the first embodiment, a high frequency magnetic material may be prepared in a sheet or bulk form in the following methods by using, as a raw material, the obtained granular insulating oxide (magnetic material) having the magnetic metal particle precipitated thereon.

(1) A plurality of the insulating particles each precipitated the magnetic metal particle are prepared. A molded body is formed by compression-molding insulating particles. Subsequently, the molded body is heated and sintered to manufacture a high frequency magnetic material in a sheet or bulk form. The bulk form includes a pellet, ring, and rectangular shapes.

The molding and heating method includes a method of forming the molded body by dye casting, followed by heating the molded body at, for example, 100 to 800° C. Preferably, the molding and heating process is realized by hot press (uniaxial pressing), HIP (hot isotropic pressing), or SPS (spark plasma sintering).

(2) Slurry containing a plurality of the insulating particles precipitated the magnetic metal particle is prepared. The slurry is molded into a sheet to form a sheet-shaped molded body. Subsequently, the molded body is heated and sintered to manufacture a sheet-shaped high frequency magnetic material.

The heating temperature is preferably 100 to 800° C., for example.

In the first embodiment, a high frequency magnetic material having a laminated structure may be manufactured by the following method.

Slurry containing a plurality of the insulating particles precipitated the magnetic metal particle is prepared. Then, the slurry is molded into a layer shape to form a magnetic material layer. A nonmagnetic insulating layer made of a metal oxide is prepared. A laminated sheet is formed by alternately stacking the magnetic material layer and the nonmagnetic insulating layer. Subsequently, the laminated sheet is heated and being then sintered in a reducing atmosphere to form a laminated body, i.e., a high frequency magnetic material, in which a magnetic material layer of 1 µm or less in thickness and the nonmagnetic insulating layer of 1 µm or less in thickness are alternately stacked.

Examples of the metal oxide include an oxide of at least one metal selected from the group consisting of Mg, Mn, Al, Si, Ca, Zr, Ti, Hf, Zn, and rare earth elements, Ba, and Sr. In particular, an oxide of Mg or Mn is preferred.

Second Embodiment

Precursor particle having a particle size of 10 nm to 1 µm, and including a first compound and a second compound is prepared. The first compound is selected from an alkoxide, a hydroxide, a sulfate, a nitrate, a carbonate, or a carboxylate of a magnetic metal containing at least one metal of Fe and Co. The second compound is selected from an alkoxide, a hydroxide, a sulfate, a nitrate, a carbonate, or a carboxylate of an a metal element for forming an oxide. Subsequently, a molded body is formed by molding a plurality of the precursor particles. Then, the molded body is heated in a reducing atmosphere. At this time, the second compound is decomposed to form an insulating body made of an oxide of the metal element, and particles of the magnetic metal in the first compound are precipitated in the insulating body in a particle size of 1 to 100 nm, thereby manufacturing a high frequency magnetic material in a bulk or sheet form.

That is, by heating the molded body consisting of precursor particles in the reducing atmosphere, the first compound, such as a salt of a magnetic metal composed of at least one of Fe and Co or an alloy based thereon, is reduced to precipitate magnetic metal particles. At the same time, the second compound, such as a salt composed of the metal element for forming an oxide in the precursor particles, is decomposed in the oxide to bond and grow oxides mutually among precursor particles. In addition, oxide is induced so as to surround the magnetic metal particles at the decomposition. As the result, the texture composed of an insulating body made of the oxide and the magnetic metal particles precipitated in the insulating body becomes denser. That is, adhesion between the insulating body and the precipitated magnetic metal particles is enhanced. This enables to obtain a high frequency magnetic material of a sheet or bulk with excellent thermal magnetic characteristic for a long time, and the volume of unnecessary space such as pores can be decreased by a dense texture to obtain a high frequency magnetic material of small size. In addition, the magnetic characteristic can be enhanced by decreasing the air gaps, such as unnecessary pores, which lower the magnetic characteristic.

The magnetic metal element, the a metal element for forming an oxide, the combination of the first and second compounds, the molar ratio of the first and second compounds, and the heating condition in the reducing atmosphere are the same as those explained in the first embodiment.

The molded body can be formed, for example, by the following two methods.

(1) A molded body is formed by compression-molding, for example, by molding by use of a die a plurality of precursor particles. In the compression-molding process, it is preferred to employ a hot press (uniaxial pressing) for heating simultaneously in a reducing atmosphere, HIP (hot isotropic pressing), or SPS (spark plasma sintering).

(2) Slurry containing precursor particles is prepared, and the slurry is then molded into a sheet to form a sheet-shaped molded body.

A volume fraction (Vf) of magnetic metal particles to the total volume of the magnetic metal particles and insulating body is preferred to be 50% or more excluding air gaps such as pores. A high frequency magnetic material having such a volume fraction of magnetic metal particles can have a high saturation magnetization per unit volume or unit weight, resulting in improvement in permeability.

It is preferred to apply a magnetic field at which the molded body is formed, or at which the molded body is heated in the reducing atmosphere.

In the second embodiment, a high frequency magnetic material having a laminated structure may be manufactured by the following method.

A magnetic material layer formed from the insulating body with the precipitated magnetic metal particles is prepared. A nonmagnetic insulating layer made of a metal oxide is prepared. Then, a laminated sheet is formed by alternately stacking the magnetic material layer and the nonmagnetic insulating layer. Subsequently, the laminated sheet is heated and then sintered in a reducing atmosphere to form a laminated body, i.e., a high frequency magnetic material, in which a magnetic material layer of 1 μm or less in thickness and the nonmagnetic insulating layer of 1 μm or less in thickness are alternately stacked.

Examples of the metal oxide include an oxide of at least one metal selected from the group consisting of Mg, Mn, Al, Si, Ca, Zr, Ti, Hf, Zn, rare earth elements, Ba, and Sr. In particular, an oxide of Mg or Mn is preferred.

In the high frequency magnetic material of such a laminated structure, the thickness of the magnetic material layer having the precipitated magnetic metal particles is set to 1 μm or less. Thereby, when a high frequency magnetic field is applied in an in-plane direction, effects of a demagnetizing field can be reduced, and the permeability can be enhanced. On the other hand, the magnetic material layers are not merely laminated, but these are laminated together with the nonmagnetic insulating oxide layer interposed therebetween. As a consequence, mutual magnetic coupling of magnetic material layers can be cut off, and the magnitude of the magnetic pole can be reduced to suppress a lowering of the effective permeability due to effects of a demagnetizing field.

As described herein, the second embodiment, which is the same as the first embodiment, realizes manufacture of a high frequency magnetic material showing an excellent magnetic characteristic in a high frequency region, the material being excellent in long-term thermal stability of a magnetic characteristic, at low cost and at high yield.

The obtained high frequency magnetic material is almost free from loss except for ferromagnetic resonance loss, and shows a high permeability at a high frequency, and has a ferromagnetic resonance frequency of several GHz. Accordingly, the high frequency magnetic material has a high permeability real part ($\mu'$) and low permeability imaginary part ($\mu''$) in a lower frequency region than the ferromagnetic resonance frequency, and therefore it can be used as a high permeability component such as an inductor. The obtained high frequency magnetic material has a low $\mu'$ and a high $\mu''$ in the vicinity of the ferromagnetic resonance frequency, and hence it can be used as an electromagnetic wave absorber.

Third Embodiment

First, an electrolytic magnetic metal powder containing at least one metal of Fe and Co is fused in an inert gas or vacuum. The fused metal is water-atomized or gas-atomized in an inert gas to produce magnetic metal particles having a minor axis length of 1 to 100 nm. The atomizing process is followed by a reducing process in hydrogen, in which the carbon content added to the fused metal is removed, or the impurity concentration in the obtained atomized powder is reduced to allow magnetic metal particles of high purity to be obtained. The obtained spherical magnetic metal particles may be used either directly, or ground or flattened by a ball mill or attriter to form flat particles with a larger aspect ratio.

Then, the magnetic metal particles are dispersed in a solution of an alkoxide, a hydroxide, a sulfate, a nitrate, a carbonate, or a carboxylate of an a metal element for forming an oxide to form a thin film having thickness of 0.1 nm to 100 nm on the surface of the magnetic metal particles, respectively, thereby producing precursor particles.

If the thickness of the thin film exceeds 100 nm, the electric insulation may be enhanced, but it may be hard to obtain magnetic coupling, and the volume fraction of magnetic metal particle may be small. A more preferred thickness of the thin film is 1 to 10 nm.

An alkoxide of the metal element contains a magnetic metal element, so that it is easy to achieve mutual magnetic coupling of magnetic metal particles after sintering, and high permeability may be easily achieved.

Subsequently, the precursor particles are heated in an inert atmosphere such as a nitrogen atmosphere or an argon atmosphere to decompose the thin film, and an insulating thin film is formed on the surface of the magnetic metal particles to manufacture a granular high frequency magnetic material.

That is, by heating the precursor particles, a thin film made of, for example, a salt of the metal element in the precursor particles is decomposed in an oxide, and the oxide produced at the decomposition is induced so as to surround the magnetic metal particles, and a dense structure is promoted. In other words, adhesion between the insulating oxide thin film and the surface of the magnetic metal particle is enhanced. This makes it possible to obtain a granular high frequency magnetic material excellent in long-term thermal magnetic characteristic, and also to obtain a high frequency magnetic material of small size by decreasing the unnecessary volume of pores by the dense structure. Further, the magnetic characteristic can be enhanced by decreasing the air gaps, such as unnecessary pores, which lower the magnetic characteristic. Still further, in the case of precursor particles, the reaction time can be shortened. This enables manufacture of a granular high frequency magnetic material having fine magnetic metal particles coated with an insulating oxide thin film with a uniform thickness.

The magnetic metal containing at least one metal of Fe and Co is the same as that explained in the first embodiment.

The minor axis of magnetic metal particles indicates a diameter in the case of spherical particles, or a shorter diameter in the case where particles are oval or flat. In particular, magnetic metal particles are preferred to be flat (for example, an aspect ratio of major axis/minor axis being 10 or more). Magnetic metal particles with a large aspect ratio impart a shape anisotropy effect to a high frequency magnetic material. That is, a high frequency magnetic material is able to have a larger permeability, but to have a lower magnetic anisotropy in the case where a magnetic field is applied to a direction of major axis. On the other hand, a high frequency magnetic material is able to have a lower permeability, but to have a larger magnetic anisotropy in the case where a magnetic field is applied to a direction of minor axis. Therefore, permeability and magnetic anisotropy of the high frequency magnetic material are controlled by controlling an aspect ratio of the magnetic metal particles and the applied magnetic field direction, thereby being able optionally control characteristics of a high frequency magnetic. Forming the magnetic metal particles into flat shape allows the filling rate of magnetic metal particles to be increased, so that the saturation magnetization per unit volume or unit weight can be increased, resulting in improvement in permeability.

Examples of the metal element include at least one metal selected from the group consisting of Mg, Mn, Al, Si, Ca, Zr, Ti, Hf, Zn, rare earth elements, Ba, and Sr. Among these metal elements, Mg and Mn are particularly preferred.

These magnetic metal particles are preferred to be aligned in at least two axes in the crystal orientation of the insulating thin film formed on the surface thereof. By such definition, matching of the magnetic metal particles and the insulating thin film is greatly improved, and a high frequency magnetic material with a highly thermal stability is obtained. Examples of combinations of the magnetic metal particles aligned in the crystal orientation in two or more axes with the insulating thin film made of the oxide of the metal element include Co/MgO, Fe—Ni/MgO, Co—Fe/MgO, Co—Ni/MgO, Co/MnO, Fe—Ni/MnO, Co—Fe/MnO, and Co—Ni/MnO.

The heating temperature is preferred to be in a range of 100 to 800° C. If the heating temperature exceeds 800° C., aggregation and particle growth of magnetic metal particles are promoted to lower the resistivity, and the high frequency magnetic characteristic may decline.

When the granular high frequency magnetic material obtained in the third embodiment is applied in a magnetic component such as an inductor or an electromagnetic wave absorber, the magnetic material is dispersed in a synthetic resin, such as epoxy resin, to be formed in a sheet or bulk form.

As described herein, the third embodiment realizes manufacture of a high frequency magnetic material showing an excellent magnetic characteristic in a high frequency region, the material being excellent in long-term thermal stability of the magnetic characteristic, at low cost and at high yield.

The obtained high frequency magnetic material is almost free from loss except for ferromagnetic resonance loss, and shows a high permeability at a high frequency, and has a ferromagnetic resonance frequency of several GHz. Accordingly, the high frequency magnetic material has a high permeability real part ($\mu'$) and a low permeability imaginary part ($\mu''$) in a lower frequency region than the ferromagnetic resonance frequency, and therefore, it can be used as a high permeability component such as an inductor. The obtained high frequency magnetic material has a low $\mu'$ and a high $\mu''$ in the vicinity of the ferromagnetic resonance frequency, and hence it can be used as an electromagnetic wave absorber.

The material has such a wide versatility that even only one high frequency magnetic material can be applied both as a high permeability component such as an inductance element, and as an electromagnetic wave absorbed by properly selecting the frequency band.

In the third embodiment, a high frequency magnetic material may be prepared in a sheet or bulk form by the following methods by using, as a raw material, the obtained a granular insulating magnetic material comprising the magnetic metal particle and an insulating thin film formed on the surface of magnetic metal particle.

(1) A molded body is formed by compression-molding a plurality of the granular insulating magnetic material, then heating and sintering the molded body, thereby manufacturing a high frequency magnetic material in a sheet or bulk form.

The molding and heating method includes a method of forming a molded body by dye casting, followed by heating the molded body at, for example, 100 to 800° C. Preferably, the molding and heating process is realized by a hot press (uniaxial pressing), HIP (hot isotropic pressing), or SPS (spark plasma sintering).

(2) Slurry containing a plurality of the granular insulating magnetic material is prepared. Subsequently, this slurry is molded into a sheet to form a sheet-shaped molded body. Then, the molded body is heated and sintered to manufacture a sheet-shaped high frequency magnetic material.

The heating temperature is preferably 100 to 800° C., for example.

In the third embodiment, a high frequency magnetic material having a laminated structure may be manufactured by the following method.

Slurry containing a plurality of the magnetic metal particles each having the insulating thin film formed on the surface thereof is prepared. Then, the slurry is molded into a layer shape to form a magnetic material layer. A nonmagnetic insulating layer made of a metal oxide is prepared. A laminated sheet is formed by alternately stacking the magnetic material layer and the nonmagnetic insulating layer. Subsequently, the laminated sheet is heated and then sintered in a reducing atmosphere to form a laminated body, i.e., a high frequency magnetic material, in which a magnetic material layer of 1 µm or less in thickness and the nonmagnetic insulating layer of 1 µm or less in thickness are alternately stacked.

Examples of the metal oxide include an oxide of at least one metal selected from the group consisting of Mg, Mn, Al, Si, Ca, Zr, Ti, Hf, Zn, rare earth elements, Ba, and Sr. In particular, an oxide of Mg or Mn is preferred.

Fourth Embodiment

Magnetic metal particles manufactured in the same manner as in the third embodiment are prepared, and these magnetic metal particles are dispersed in a solution of an alkoxide, a hydroxide, a sulfate, a nitrate, a carbonate, or a carboxylate of a metal element for forming an oxide to form a thin film having a thickness of 0.1 to 100 nm on the surface of the magnetic metal particles, respectively, thereby preparing precursor particles. Then, a molded body is formed by molding a plurality of precursor particles. Subsequently, the molded body is heated in an inert atmosphere, such as a nitrogen atmosphere or an argon atmosphere. At this time, the thin film decomposes to form oxides of the metal element on the surface of the magnetic metal particles, and the oxides are mutually bonded to form insulating body, thereby manufacturing a high frequency magnetic material in a sheet or bulk form.

That is, by heating the molded body, a thin film made of, for example, a salt of a metal element for forming an oxide of precursor particles is decomposed in the oxide, and the oxide is induced so as to surround the magnetic metal particles at the decomposition. As a result, a dense structure of an insulating body made of the oxide is promoted. In other words, adhesion of the insulating body to the magnetic metal particle surface is enhanced. This makes it possible to obtain a sheet or bulk high frequency magnetic material excellent in long-term thermal magnetic characteristic, and also to obtain a high frequency magnetic material of small size by decreasing the unnecessary volume of pores by the dense structure. Further, the magnetic characteristic can be enhanced by decreasing the air gaps, such as unnecessary pores, which lower the magnetic characteristic. Still further, in the case of precursor particles, the reaction time can be shortened. This enables manufacture of a sheet or bulk high frequency magnetic material in which the magnetic metal particles are uniformly dispersed.

The magnetic metal particles, a metal element for forming an oxide, and the heating condition are same as those explained in the third embodiment.

The molded body can be formed, for example, by the following two methods.

(1) A molded body is formed by compression-molding, for example, by molding by use of a die a plurality of precursor particles. In the compression-molding process, it is preferred to employ a hot press (uniaxial pressing) for heating simultaneously in a reducing atmosphere, HIP (hot isotropic pressing), or SPS (spark plasma sintering).

(2) Slurry containing precursor particles is prepared, and the slurry is then molded into a sheet to form a sheet-shaped molded body.

A volume fraction (Vf) of magnetic metal particles and magnetic metal particles to insulating oxide is preferred to be 50% or more excluding air gaps such as pores. A high frequency magnetic material having such a volume fraction of magnetic metal particles can be increased in saturation magnetization per unit volume or unit weight, resulting in improvement in permeability.

It is preferred to apply a magnetic field at which the molded body is formed, or at which the molded body is heated in the inert atmosphere.

In the fourth embodiment, a high frequency magnetic material having a laminated structure may be manufactured by the following method.

A magnetic material layer formed from the insulating body, in which the magnetic metal particles is dispersed, is prepared. A nonmagnetic insulating layer made of a metal oxide is prepared. Then, a laminated sheet is formed by alternately stacking the magnetic material layer and the nonmagnetic insulating layer. Subsequently, the laminated sheet is heated and then sintered in a reducing atmosphere to form a laminated body, i.e., a high frequency magnetic material, in which a magnetic material layer of 1 µm or less in thickness and the nonmagnetic insulating layer of 1 µm or less in thickness are alternately stacked.

Examples of the nonmagnetic insulating oxide include an oxide of at least one metal selected from the group consisting of Mg, Mn, Al, Si, Ca, Zr, Ti, Hf, Zn, rare earth elements, Ba, and Sr. In particular, an oxide of Mg or Mn is preferred.

In the high frequency magnetic material of such a laminated structure, magnetic material layer containing the magnetic metal particles is set to 1 µm or less. Thereby, when a high frequency magnetic field is applied in an in-plane direction, effects of an antimagnetic field can be reduced, and the permeability can be enhanced. On the other hand, the magnetic material layers are not merely laminated, but they are laminated together with the nonmagnetic insulating oxide layer interposed therebetween. As a consequence, mutual magnetic coupling of magnetic material layers can be cut off, and the magnitude of the magnetic pole can be reduced to suppress drop of effective permeability due to effects of a demagnetizing field.

As described herein, the fourth embodiment, same as the third embodiment, realizes manufacture of a high frequency magnetic material showing an excellent magnetic characteristic in a high frequency region, the material being excellent in long-term thermal stability of a magnetic characteristic, at low cost and at high yield.

The obtained high frequency magnetic material is almost free from loss except for ferromagnetic resonance loss, and shows a high permeability at a high frequency, and has a ferromagnetic resonance frequency of several GHz. Accordingly, the high frequency magnetic material has a high permeability real part ($\mu'$) and low permeability imaginary part ($\mu''$) in a lower frequency region than the ferromagnetic resonance frequency, and therefore it can be used as a high permeability component such as an inductor. The obtained high frequency magnetic material has a low $\mu'$ and a high $\mu''$ in the vicinity of the ferromagnetic resonance frequency, and hence it can be used as an electromagnetic wave absorber.

In the high frequency magnetic materials according to the first to fourth embodiments, a material texture and a diffraction pattern can be evaluated by scanning electron microscopy (SEM) or transmission electron microscopy (TEM); trace elements can be identified by inductively coupled plasma (ICP) emission analysis, fluorescent X-ray analysis, electron probe micro-analysis (EPMA) or energy dispersive X-ray fluorescence spectrometer (EDX); and substituents can be identified by infrared (IR) absorption analysis.

The invention will be more specifically described below by comparing the examples with comparative examples. In the following examples 1 to 6, a mean crystal particle size of precipitated magnetic metal particles was measured by TEM observation. Specifically, the longest diagonal line and the shortest diagonal line of observed (photographed) individual particles were averaged to determine the particle size, and the average particle size was used. The photograph is taken in the unit area of 10 μm×10 μm of three or more positions.

Example 1

Fe(OH)$_2$ and Mg(OH)$_2$ were mixed at a molar ratio (Fe:Mg) of 2:1, and calcined for 5 hours at 110° C. to evaporate hydrate, and precursor particles of about 100 nm in particle size were prepared. Subsequently, the precursor particles were put in a hydrogen furnace, and the temperature was raised to 600° C. while allowing hydrogen gas of a purity of 99.9% to flow at a flow rate of 200 mL/min. Then, the particles were reduced at such temperature for 30 minutes, and cooled in the furnace to manufacture a granular high frequency magnetic material of about 1 μm in particle size. The obtained granular high frequency magnetic material had Fe particles of 53 nm in average particle size precipitated in MgO by a volume fraction of 52%.

Next, the obtained plural granular high frequency magnetic materials were mixed in epoxy resin by 2% by weight. Then, the mixture was molded to form a sheet having 4 mm in width, 5 mm in length, and 1 mm in thickness. The sheet was cured at 150° C. to be provided as a sample for evaluation.

Example 2

CoCO$_3$ and MgCO$_3$ were mixed at a molar ratio (Co:Mg) of 2:1, and calcined for 5 hours at 110° C. to evaporate a hydrate, and precursor particles of about 100 nm in particle size were prepared. Subsequently, the precursor particles were put in a hydrogen furnace, and the temperature was raised to 600° C. while allowing hydrogen gas of a purity of 99.9% to flow at a flow rate of 200 mL/min. Then, the particles were reduced at such temperature for 30 minutes, and cooled in the furnace to manufacture a granular high frequency magnetic material of about 1 μm in particle size. The obtained granular high frequency magnetic material had Co particles of 40 nm in average particle size precipitated in MgO by a volume fraction of 51%. Thereafter, the granular high frequency magnetic material was used to prepare a sheet material for evaluation in the same manner as in Example 1.

Example 3

Fe(OH)$_2$ and Si(OH)$_4$ were mixed at a molar ratio (Fe:Si) of 4:1, and calcined for 5 hours at 110° C. to evaporate hydrate, and precursor particles of about 100 nm in particle size were prepared. Subsequently, the precursor particles were put in a hydrogen furnace, and the temperature was raised to 600° C. while allowing hydrogen gas of a purity of 99.9% to flow at a flow rate of 200 mL/min. Then, the particles were reduced at such temperature for 30 minutes, and cooled in the furnace to manufacture a granular high frequency magnetic material of about 1 μm in particle size. The obtained granular high frequency magnetic material had Fe particles of 55 nm in average particle size precipitated in SiO$_2$ by a volume fraction of 52%. Thereafter, the granular high frequency magnetic material was used to prepare a sheet material for evaluation in the same manner as in Example 1.

Example 4

Co spherical particles of 1 μm in particle size synthesized by an atomizing method were flattened by a ball mill to synthesize Co particles with a length of 49 nm in the minor axis direction. Subsequently, the plurality of Co particles were put in a container filled with an aqueous ammonium solution, and an aqueous solution of magnesium nitrate, was dropped while stirring the aqueous solution to coat the surface of the Co particles with a thin film of magnesium hydroxide. Then, the Co particles were calcined for 5 hours at 110° C. to evaporate a hydrate, thereby preparing precursor particles. Subsequently, the precursor particles were put in a hydrogen furnace, and the temperature was raised to 600° C. at a rate of 10° C./min while allowing hydrogen gas of a purity of 99.9% to flow at a flow rate of 200 mL/min. Then, the particles were reduced at such temperature for 30 minutes, and cooled in the furnace to manufacture a granular high frequency magnetic material. The obtained granular high frequency magnetic material had flat Co particles with a length of 49 nm in the minor axis direction existing in MgO by a volume fraction of 51%. The granular high frequency magnetic material was then used to prepare a sheet sample for evaluation in the same manner as in Example 1.

Example 5

Co(OH)$_2$ and Mg(OH)$_2$ were weighed and mixed at a molar ratio (Co:Mg) of 2:1. The mixture was calcined for 5 hours at 110° C. to evaporate hydrate, and precursor particles of about 100 nm in particle size were prepared. The precursor particles were dispersed in water to obtain slurry, and then the slurry was molded into a sheet. The sheet was calcined for 5 hours at 110° C. in a magnetic field of a permanent magnet of 1 Tesla, and put in a hydrogen furnace, and the temperature was raised to 600° C. at a rate of 10° C./min while allowing hydrogen gas of a purity of 99.9% to flow at a flow rate of 200 mL/min as well as applying a magnetic field of 1 Tesla. The sheet was reduced at the temperature held for 30 minutes, and cooled in the furnace to manufacture a high frequency magnetic material of 1 mm thickness, which was provided as a sample for evaluation. The obtained high frequency magnetic material had Co particles of 51 nm in average particle size precipitated in MgO by a volume fraction of 51%.

Example 6

Co(OH)$_2$ and Mg(OH)$_2$ were weighed and mixed at a molar ratio (Co:Mg) of 2:1, and calcined for 5 hours at 110° C. to evaporate a hydrate, and precursor particles of about 100 nm in particle size were prepared. The precursor particles were dispersed in water to obtain slurry, and then the slurry was molded into a sheet. On the sheet, a nonmagnetic insulating layer made of MgO was molded and pre-calcined. This process was repeated five times and calcined for 5 hours at 110° C. to fabricate a laminated sheet configured by stacking up five layers each of a magnetic material layer and insulating layer. Thereafter, the laminated sheet was put in a hydrogen furnace, and the temperature was raised to 600° C. while allowing hydrogen gas of a purity of 99.9% to flow at a flow rate of 200 mL/min. Then, the laminated sheet was reduced at the temperature held for 30 minutes, and cooled in the furnace to manufacture a laminated high frequency magnetic material. In the obtained laminated high frequency magnetic material, the magnetic material layer had a thickness of 1 μm and Co particles of 52 nm in average particle size precipitated in MgO by a volume fraction of 51%. The nonmagnetic insulating oxide layer had a thickness of 1 μm.

In Examples 1 to 4 and 6, a difference between standard formation Gibbs energy of the precipitated magnetic metal particles and standard formation Gibbs energy of the oxide of the metal element was 100 kJ/mol.

Comparative Example 1

Fe powder of 1 µm in average particle size, and MgO powder of 1 µm in average particle size were weighed to a molar ratio of 6:4, and mixed for 1 hour to prepare a mixed powder. The mixed powder was put in a stainless steel container together with stainless steel balls, and the container was displaced with argon gas and sealed. Then, the Fe powder was pulverized to 100 nm by mechanical alloying process of mixing for 100 hours at 300 rpm. After the treatment, the mixed powder was put in a vacuum furnace, and the temperature was raised to 500° C. for 1 hour, and reduced in 1 hour to thereby prepare a sheet sample for evaluation in the same manner as in Example 1.

Comparative Example 2

FeAlSi particles were mixed in epoxy resin by 2% by weight. Then, the mixture was molded to form a sheet having 4 mm in width, 5 mm in length, and 1 mm in thickness. The sheet was cured at 150° C. to be provided as a sample for evaluation.

Comparative Example 3

Carbonyl iron particles were mixed in an epoxy resin by 2% by weight. Then, the mixture was molded to form a sheet having 4 mm in width, 5 mm in length, and 1 mm in thickness. The sheet was cured at 150° C. to be provided as a sample for evaluation.

Comparative Example 4

A sheet having 4 mm in width, 5 mm in length, and 1 mm in thickness was cut out from an NiZn ferrite sintered body, and the obtained sheet was provided as a sample for evaluation.

Table 1 shows compositions or the like of the precursor particles obtained in Examples 1 to 6 and Comparative examples 1 to 4.

The samples for evaluation of Examples 1 to 6 and Comparative examples 1 to 4 were investigated by the following methods to determine the permeability real part $\mu'$, changes of the permeability real part $\mu'$ in 100 hours, and electromagnetic wave absorption characteristics. The results are shown in Table 2.

1) Permeability Real Part $\mu'$

Using the PMM-9G1 system manufactured by Ryowa Electronics Co., Ltd., an induced voltage and an impedance value were measured at which the air was the background under 1 GHz or less and at which the sample was placed. The permeability real part $\mu'$ was calculated from the measured induced voltage and impedance value. The samples which are machined to a size of 4×4×0.5 mm were used.

2) Changes of Permeability Real Part $\mu'$ in 1000 Hours

The samples for evaluation were stored in a thermostatic oven controlled at a temperature of 60° C. and humidity of 90% for 1000 hours, and the permeability real part $\mu'$ was measured again to determine the change rate (permeability real part $\mu'$ in 1000 hours/permeability real part $\mu'$ before storage).

3) Electromagnetic Wave Absorption Characteristics

Metal thin plates of 1 mm in thickness, each of the plates having the same area, were adhered to the electromagnetic wave illuminated side and the opposite side of each of the samples for evaluation. Then, measurement was performed using a reflected electric power method in a free space in an $S_{11}$ mode of a sample network analyzer under an electromagnetic wave of 2 GHz. The reflected electric power method involves measuring the difference, in dB, of the reflection level between the sample and a metal thin film (complete reflection body) having no sample adhered thereon. The absorption amount of the electromagnetic wave was defined by the reflected attenuation amount on the basis of the measurement, and a relative value was determined supposing the absorption amount of Comparative example 1 to be 1. In Example 6, however, the value was standardized by thickness, and compared as the absorption amount per unit thickness.

Generally, a high frequency magnetic material, which is almost free from loss exclusive ferromagnetic resonance loss, and has a high permeability at high frequency, has a high permeability real part ($\mu'$) and a low permeability imaginary part ($\mu''$) in a frequency band lower than a ferromagnetic resonance frequency. Hence, the material can be used as a high permeability component such as an inductor. On the other hand, such a material has a low permeability real part ($\mu'$) and a high permeability imaginary part ($\mu''$) in the vicinity of the ferromagnetic resonance frequency, and therefore it can be used as an electromagnetic wave absorber. In other words, even only one high frequency magnetic material can be applied both as a high permeability component and as an electromagnetic wave absorbed by properly selecting the frequency band. A magnetic characteristic evaluation was carried out to investigate a potential of a high permeability component by evaluating the permeability real part ($\mu'$) under 1 GHz, and to investigate a potential of an electromagnetic wave absorber by measuring absorption amount of the electromagnetic wave under 2 GHz.

TABLE 1

| | Composition of precursor particles | | | Particle size of precipitated magnetic metal particles (nm) | Volume fraction of magnetic metal particles (vol. %) | Crystal axis matching between magnetic metal particles and oxide | Other modes |
|---|---|---|---|---|---|---|---|
| | Salt of magnetic metal (A) | Salt of metal (B) for forming oxide | Molar ratio of magnetic metal (A) to metal (B) | | | | |
| Example 1 | Fe(OH)$_2$ | Mg(OH)$_2$ | Fe:Mg = 2:1 | 53 | 52 | None | — |
| Example 2 | CoCO$_3$ | MgCO$_3$ | Co:Mg = 2:1 | 40 | 51 | 2-axis matching | — |

TABLE 1-continued

| | Composition of precursor particles | | | Particle size of precipitated magnetic metal particles (nm) | Volume fraction of magnetic metal particles (vol. %) | Crystal axis matching between magnetic metal particles and oxide | Other modes |
|---|---|---|---|---|---|---|---|
| | Salt of magnetic metal (A) | Salt of metal (B) for forming oxide | Molar ratio of magnetic metal (A) to metal (B) | | | | |
| Example 3 | Fe(OH)$_2$ | Si(OH)$_4$ | Fe:Si = 4:1 | 55 | 52 | None | — |
| Example 4 | Co | Mg(OH)$_2$ | Co:Mg = 2:1 | 49 | 51 | 2-axis matching | MgO coating on Co particles |
| Example 5 | Co(OH)$_2$ | Mg(OH)$_2$ | Co:Mg = 2:1 | 51 | 51 | 2-axis matching | Magnetic field orientation |
| Example 6 | Co(OH)$_2$ | Mg(OH)$_2$ | Co:Mg = 2:1 | 52 | 51 | 2-axis matching | Lamination of 5 layers each of nonmagnetic insulating layer (MgO)/magnetic layer |
| Comparative Example 1 | MgO | Fe | Fe:Mg = 0.6:0.4 | 100 | — | None | — |
| Comparative Example 2 | FeAlSi + Resin | | | | | None | — |
| Comparative Example 3 | Carbonyl iron + Resin | | | | | None | — |
| Comparative Example 4 | NiZn ferrite sintered body | | | | | None | — |

TABLE 2

| | Characteristics of high frequency magnetic material | | | |
|---|---|---|---|---|
| | Permeability real part μ' (at 1 GHz) | Changes of permeability real part μ' in 1000 hours (at 1 GHz) | Electromagnetic wave absorption characteristics (at 2 GHz) | Time required for manufacture (hours) |
| Example 1 | 88 | 0.90 | 1.5 | 12 |
| Example 2 | 82 | 0.97 | 1.45 | 12 |
| Example 3 | 89 | 0.88 | 1.5 | 12 |
| Example 4 | 79 | 0.98 | 1.45 | 12 |
| Example 5 | 91 | 0.96 | 1.4 | 12 |
| Example 6 | 120 | 0.95 | 1.6 | 12 |
| Comparative Example 1 | 7 | 0.79 | 0.9 | 103 |
| Comparative Example 2 | 10 | 0.8 | 1.0 | — |
| Comparative Example 3 | 2 | 0.76 | 0.4 | — |
| Comparative Example 4 | 5 | 0.96 | 0.65 | — |

As clear from Table 1 and Table 2, the high frequency magnetic materials of Examples 1 to 6 having an average particle size of precipitating magnetic metal particles of 1 to 100 nm show excellent magnetic characteristics as compared with those of Comparative examples 1 to 4. The permeability real part (μ') is at 1 GHz only, but a flat frequency characteristic is shown, and substantially the same value is shown at 100 MHz.

It is found that the high frequency magnetic materials of Examples 2, 4, 5 and 6, which were successful in crystal axis matching between the magnetic metal particles and the insulating oxide, are smaller in change of the permeability real part in 1000 hours, and show an extremely high thermal stability.

It is found that the high frequency magnetic material of Example 5, in which the precipitated magnetic metal particles are oriented, is slightly higher in the value of permeability.

It is also found that the high frequency magnetic material of Example 6, in which five layers each of the magnetic material layer of 1 μm in thickness and the insulating oxide layer of 1 μm in thickness were alternatively laminated, decreases the effect of an demagnetizing field, and can realize further excellent permeability and electromagnetic wave absorption characteristic.

Thus, of the high frequency magnetic materials of Examples 1 to 6, the permeability real part (μ') is high at 1 GHz, the thermal stability is excellent, and the materials can be used as a high permeability component in the 1 GHz band. Moreover, the electromagnetic wave absorption characteristic at 2 GHz is excellent, and the materials can be also used as an electromagnetic wave absorber in a 2 GHz band. That is, the materials have such a wide versatility that the high frequency magnetic material can be applied both as a high permeability component and as an electromagnetic wave absorbed by properly selecting the frequency band used. The time required for the manufacturing process in the embodiments is extremely short as compared with the mechanical alloying method (Comparative example 1). This allows the process cost to be lowered substantially and the manufacturing yield to be enhanced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a high frequency magnetic material, comprising:
    preparing a precursor particle having a particle size of 10 nm or more and 1 μm or less, and comprising a first compound selected from an alkoxide, a hydroxide, a sulfate, a nitrate, a carbonate, or a carboxylate of a magnetic metal containing at least one metal of Fe and Co, and a second compound selected from an alkoxide, a hydroxide, a sulfate, a nitrate, a carbonate, or a carboxylate of a metal element for forming an oxide; and
    heating the precursor particle in a reducing atmosphere to form an insulating particle made of an oxide of the metal element by decomposing the second compound, and to precipitate a particle of the magnetic metal in the insulating particle at a particle size of 1 nm or more and 100 nm or less.

2. The method according to claim 1, wherein the first and second compounds are selected so that a difference between the standard formation Gibbs energy of the magnetic metal particle and the standard formation energy of the oxide of the metal element is 100 kJ/mol or less at a temperature of 100° C. or more and 800° C. or less.

3. The method according to claim 1, wherein a magnetic field is applied at which the precursor particle is heated in the reducing atmosphere.

4. The method according to claim 1, wherein the magnetic metal particle has its crystal orientation aligned at least in two axes in the crystal orientation of the insulating particle.

5. The method according to claim 1, wherein a volume fraction of the magnetic metal particle to a total volume of the magnetic metal particle and the insulating particle is 50% or more.

6. The method according to claim 1, further comprising:
    preparing a plurality of the insulating particles each precipitated the magnetic metal particle;
    compression-molding the insulating particles to form a molded body; and
    heating and sintering the molded body.

7. The method according to claim 1, further comprising:
    preparing slurry containing a plurality of the insulating particles each precipitated the magnetic metal particle;
    molding the slurry into a sheet to form a sheet-shaped molded body; and
    heating and sintering the molded body.

8. The method according to claim 1, further comprising:
    preparing slurry containing a plurality of the insulating particles each precipitated the magnetic metal particle;
    molding the slurry into a layer shape to form a magnetic material layer;
    preparing a nonmagnetic insulating layer made of a metal oxide;
    forming a laminated sheet by alternately stacking the magnetic material layer and the nonmagnetic insulating layer; and
    heating and sintering the laminated sheet in a reducing atmosphere to form a laminated body in which a magnetic material layer of 1 μm or less in thickness and the nonmagnetic insulating layer of 1 μm or less in thickness are alternately stacked.

9. A method of manufacturing a high frequency magnetic material, comprising:
    preparing a precursor particle comprising a magnetic metal particle with a length in the minor axis direction of 1 nm or more and 100 nm or less in particle size containing at least one metal of Fe and Co, and a thin film having a thickness of 1 nm or more and 100 nm or less and formed on the surface of the magnetic metal particle, and the thin film being made of an alkoxide, a hydroxide, a sulfate, a nitrate, a carbonate, or a carboxylate of a metal element for forming an oxide; and
    heating the precursor particle to form an insulating thin film made of an oxide of the metal element on the surface of the magnetic metal particle by decomposing the thin film.

10. The method according to claim 9, wherein the magnetic metal particle has its crystal orientation aligned at least in two axes in the crystal orientation of the insulating thin film.

11. The method according to claim 9, further comprising:
    preparing a plurality of the magnetic metal particles each having the insulating thin film formed on the surface thereof;
    compression-molding the magnetic metal particles to form a molded body; and
    heating and sintering the molded body.

12. The method according to claim 9, further comprising:
    preparing slurry containing a plurality of the magnetic metal particles each having the insulating thin film formed on the surface thereof;
    molding the slurry into a sheet to form a sheet-shaped molded body; and
    heating and sintering the molded body.

13. The method according to claim 9, further comprising:
    preparing slurry containing a plurality of the magnetic metal particles each having the insulating thin film formed on the surface thereof;
    molding the slurry into a layer shape to form a magnetic material layer;
    preparing a nonmagnetic insulating layer made of a metal oxide;
    forming a laminated sheet by alternately stacking the magnetic material layer and the nonmagnetic insulating layer; and
    heating and sintering the laminated sheet in a reducing atmosphere to form a laminated body in which a magnetic material layer of 1 μm or less in thickness and the nonmagnetic insulating layer of 1 μm or less in thickness are alternately stacked.

* * * * *